(12) United States Patent
Ukigawa et al.

(10) Patent No.: US 6,938,098 B1
(45) Date of Patent: Aug. 30, 2005

(54) METHOD FOR PROVIDING DIGITAL CONTENTS WITH OFFERING ACCESS INCENTIVE

(75) Inventors: Kazunori Ukigawa, Tokushima (JP); Hiroki Yamashita, Chiba (JP); Akira Yamada, Tokushima (JP)

(73) Assignee: Justsystem Corporation, Tokushima (JP)

(*) Notice: Subject to any disclaimer, the term of this patent is extended or adjusted under 35 U.S.C. 154(b) by 641 days.

(21) Appl. No.: 09/666,087

(22) Filed: Sep. 21, 2000

(30) Foreign Application Priority Data

Sep. 21, 1999 (JP) .................................. 11-267258

(51) Int. Cl.[7] .............................................. G06F 15/16
(52) U.S. Cl. ...................... 709/246; 709/207; 709/203
(58) Field of Search ........................ 709/204, 206–207, 709/217, 223–224, 203, 246

(56) References Cited

U.S. PATENT DOCUMENTS 6,377,936 B1 * 4/2002 Henrick et al. ............... 705/14
6,607,136 B1 * 8/2003 Atsmon et al. ............. 235/492
6,609,106 B1 * 8/2003 Robertson .................... 705/26

* cited by examiner

Primary Examiner—Ario Etienne
Assistant Examiner—Hussein El-chanti
(74) Attorney, Agent, or Firm—McDermott Will & Emery LLP

(57) ABSTRACT

Prepare a server comprising an information provider, a login processor, a user storage unit, a mail sender, and the like, on the internet. The information provider provides information while improving contents of incentive (prize or the like) as increase of the number of terminals which have logged in via the internet. The login processor refers to the user storage unit. If the terminal being login is a new corner, the login processor notifies the information provider of it. The information provider counts the number of the terminals which are logging in based on the notification. The mail sender sends mails for promoting usage of new information (promotional mail) to users who have already utilized the similar service. The mail sender also sends the promotional mails to persons who have introduced by the members of the service.

3 Claims, 6 Drawing Sheets

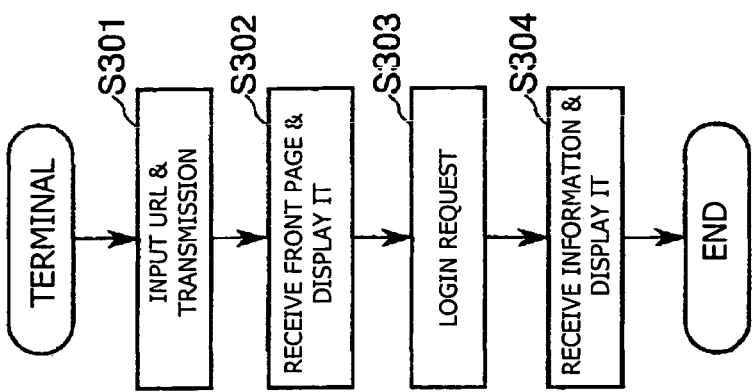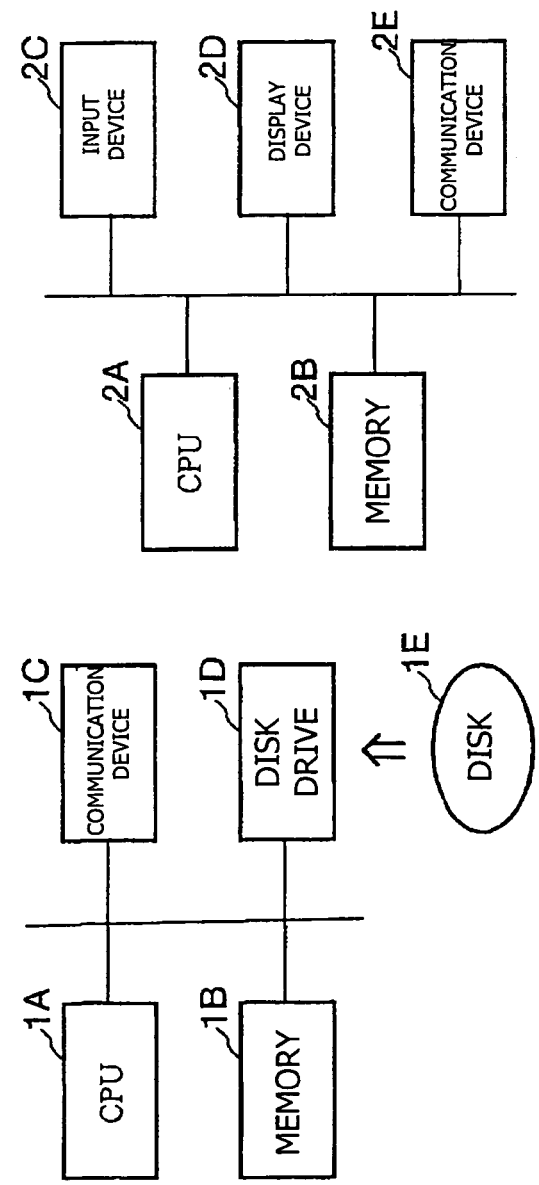

FIG. 7A

INVITE YOUR FRIEND

HIS/HER
NAME : ☐

ADDRESS : ☐

YOUR
NAME : ☐

ADDRESS : ☐

[SUBMIT]   [CANCEL]

FIG. 7B

This is ○○ net.

You (△△) are invited by ✕✕ (xxx@xxxxxx).

We are conducting a quiz campaign!

The more the participants you invite,
the more the prize you get!

Winner's Prize is:

Now                              ¥10,000
If 1,000 participants      ¥50,000
If 2,000 participants    ¥100,000

If 10,000 participants
         wow!   ¥1,000,000!

Now, Come and Join us!

Access web site below to participate
                                the quiz campaign www.OOO.OOO./OOO

METHOD FOR PROVIDING DIGITAL CONTENTS WITH OFFERING ACCESS INCENTIVE

BACKGROUND OF THE INVENTION

1. Field of the Invention

The present invention relates to a network system, a method for offering incentive, a server apparatus, and a recording medium storing a program, for offering incentives to network service users.

2. Description of the Related Art

Various web sites are on WWW (World Wide Web) to provide various kinds of information. Of such the web sites, there are commercial sites which collect charges for advertisement or information on the sites. In general, advertisement fees may depend on the number of accesses. Some of the sites determines information charges based on the number of persons who can receive information, instead of data amount. Under such the situation, providing information to many terminals, that is, getting more users of the information providing service is preferable matter for managing a commercial site.

In order to get more users, some of the sites offer incentive to the users to access the sites by preparing prizes. Sending e-mails to members of predetermined groups, applying links to other web sites to the web page, etc. have been major ways to get more users.

However, since the prizes are determined by the information provider, some of the users do not have motivation to access the sites if they are not interested in the prizes. A few new users are obtained by offering incentive in such the manner.

The aim of the conventional method is to entice users of other information services into joining the target service. A method wherein a member of the service entice others to join the service has not been made. Moreover, only a few users enjoy benefits of the incentive.

SUMMARY OF THE INVENTION

It is an object of the present invention to provide a method of offering incentive, etc. which enables to increase the number of members of information providing service efficiently by offering incentive.

To achieve the above object, a network system according to a first aspect of the present invention is a network system which comprises a server, and a plurality of terminals connected to the server via a network, and is to provide predetermined service to the terminals via the network from the server, wherein, the server comprises:
request receiving means for receiving requests for service supply transmitted by each of the plural terminals via the network;
information transmitting means for transmitting information corresponding to service to be provided, to the terminal transmitted the request received by the request receiving means via the network;
incentive offering means for offering predetermined incentive to at least some of the terminals which transmitted the requests received by the request receiving means;
requests count means for counting the number of the terminals which transmitted the requests received by the request receiving means; and
incentive modifying means for modifying contents of the incentive offered by the incentive offering means in accordance with the number of the terminals counted by the requests count means;
each of the terminals comprises:
request transmission means for transmitting a request to the server for providing the service via the network; and
information receiving means for receiving information corresponding to service to be provided, which is transmitted by the information transmission means via the network.

In the above network system, the contents of incentive to be offered is modified in accordance with the number of the service users. The modification of the incentive contents attracts the users to the service, thus utilization of the service is promoted. As a result, it increases the number of the users of the service provided via the network efficiently.

In the above network system, the server may further comprise promotional information transmitting means for transmitting information for promoting requests for the service together with information representing contents of the incentive to be offered to predetermined terminals of the plural terminals via the network.

Since a method for providing information to promote the service utilization is thus prepared, it further increases the number of the service users more effectively.

To achieve the above object, a network system according to a second aspect of the present invention comprises a server, and a plurality of terminals connected to the server via a network, wherein the server comprises a memory for storing a program, a processor for executing the program, and a first communication device for transmitting/receiving information to/from the terminals, receives a request for providing the service transmitted by each of the plural terminals via the network, through the first communication device, counts the number of the terminals which transmitted the requests, transmits information corresponding to the service to be provided, to the terminals which transmitted the requests in response to reception of the requests, via the network through the first communication device, and modifies contents of the incentive to be offered, in accordance with the counted number of the terminals, and transmits it through the first communication device to at least some of the terminals which transmitted the requests, the terminal comprises a memory for storing a program, a processor for executing the program, an output device for outputting information, and a second communication device for transmitting/receiving information to/from the server, requests the server to provide the service, via the network through the second communication device, receives the information transmitted by the server in response to the request via the network, through the second communication device, and outputs the received information through the output device.

To achieve the above object, a network system according to a third aspect of the resent invention supplies predetermined incentive to at least some of persons who have utilizes service provided via network, comprising:
user count means for counting the number of users of the service via the network; and incentive modifying means for modifying contents of incentive to be offered, in accordance with the number of the users counted by the user count means.

The above network system may further comprise usage promotional information supply means for supplying information for promoting usage of the service to predetermined persons of persons who can utilize the service, via the network.

To achieve the above object, a method of offering incentive according to a fourth aspect of the present invention offers predetermined incentive to at least some of users of service provided via network, comprises the steps of:
  counting the number of the users who utilize the service via the network; and
  modifying contents of incentive to be offered, in accordance with the number of the users counted by the user counting step.

The above incentive offering method may further comprise usage promotional information supplying step of supplying information for promoting usage of the service, to predetermined persons of persons who can utilize the service.

To achieve the above object, a server according to a fifth aspect of the present invention is a server being connected to a plurality of terminals via a network, which provides predetermined service on request from the terminals, comprises:
  incentive offering means for offering predetermined incentive to at least some of the terminals which have requested the service;
  request count means for counting the number of the terminals which requested the service; and
  incentive modifying means for modifying contents of the incentive to be offered by the incentive offering means in accordance with the number of the terminals which have requested the service.

In the above server, the request count means may comprise means for counts the number of the terminals which did not request the service as the number of the terminal requesting the service. As a result, it increases the number of the users of the service provided via the network efficiently.

In the above server, the incentive modifying means may modify the contents of the incentive when the number of the terminals counted by the request count means reaches predetermined number.

In this case, the above server may further comprise visible information transmitting means for transmitting information which visibly shows the relationship between the number of the terminals when the incentive modifying means modifies the contents of the incentive and the number of the terminals counted by the request count means, to the terminals which have requested the service via the network.

Accordingly, information which visibly indicates the relationship between the number of the terminals for modifying the contents of the incentive by the incentive modifying means and the number of the terminals counted by the request count means, is transmitted to the terminals, and the terminals output the information. As a result, it is able to promote inviting new users by the members more effectively.

The above server may further comprise promotional information transmitting means for transmitting information prepared for promoting service request together with information representing the contents of the incentive to be offered, to predetermined terminals of the plural terminals via the network.

Since a method for providing information to promote utilization of the service is thus prepared, it increases the number of the service users more efficiently.

The promotional information transmitting means may comprise address information storage means which stores address information of at least some of the plural terminals, and may transmit information for promoting service request in accordance with the address information stored in the address information storage means.

In this case, the address information storage means may store the address information with dividing it into groups in accordance with predetermined standards, and
  the promotional information transmission means may transmit information for promoting service request in accordance with the address information belonging to any one of the groups corresponding to the contents of the incentive to be offered by the incentive offering means.

The promotional information transmitting means may comprise address information receiving means which receives address information of other terminals transmitted by the terminal which has requested the service via the network, and transmits the information for promoting service request in accordance with the address information received by the address information receiving means.

In a case where the promotional information transmitting means is thus structured, it is able to obtain new users through the grapevine. As a result, it increases the number of the service users more efficiently.

To achieve the above object, a server according to a sixth aspect of the present invention is a server being connected to a plurality of terminals via a network, which comprises a memory for storing a program, a processor for executing the program, and a communication device for transmitting/receiving information to/from the terminals, wherein the server receives request for service transmitted by each of the plural terminals via the network, through the communication device,
  counts the number of terminals which transmitted the requests,
  transmits information corresponding to service to be provided to the terminal devices which have requested the service, through the communication device in response to the request reception, via the network,
  modifies the contents of the incentive to be offered in accordance with the counted number of the terminals, and supplies it to at least some of the terminal devices which have requested, through the communication device.

To achieve the above object, a computer readable recording medium storing a program according to a seventh aspect of the present invention, the program causes a computer being connected to a plurality of terminals via a network to function as:
  incentive offering means for offering predetermined incentive to at lease some of the terminals which have requested service;
  request count means for counting the number of the terminals which have requested the service; and
  incentive modifying means for modifying the contents of the incentive to be offered by the incentive offering means, in accordance with the number of the terminals counted by the request count means.

In the above computer readable recording medium, the program may further cause the computer to function as promotional information transmitting means for transmitting information for promoting request for the service together with information representing the contents of the incentive to be offered, to predetermined terminals of the plural terminals via the network.

To achieve the above object, a program data signal embedded in a carrier wave signal to be transferred via a communication path according to an eighth aspect of the present invention, the program data signal causes a computer being connected to a plurality of terminals via a network to function as:

incentive offering means for offering predetermined incentive to at lease some of the terminals which have requested service;

request count means for counting the number of the terminals which have requested the service; and incentive modifying means for modifying the contents of the incentive to be offered by the incentive offering means, in accordance with the number of the terminals counted by the request count means.

The program data signal may causes the computer to function as promotional information transmitting means for transmitting information for promoting request for the service together with information representing the contents of the incentive to be offered, to predetermined terminals of the plural terminals via the network.

BRIEF DESCRIPTION OF THE DRAWINGS

These objects and other objects and advantages of the present invention will become more apparent upon reading of the following detailed description and the accompanying drawings in which:

FIG. 2A is a diagram showing the structure of a server shown in FIG. 1, and FIG. 2B is a diagram showing the structure of a terminal shown in FIG. 1;

FIG. 3 is a flowchart showing process to be executed by the terminal shown in FIG. 1;

FIG. 7A is a diagram exemplifying a page for introducing friends represented by an information set to be sent to the terminal from the server, and FIG. 7B is a diagram exemplifying a mail to be sent to the terminal from the server.

DETAILED DESCRIPTION OF THE PREFERRED EMBODIMENT

An embodiment of the present invention will now be described with reference to accompanied drawings.

Figure 1:
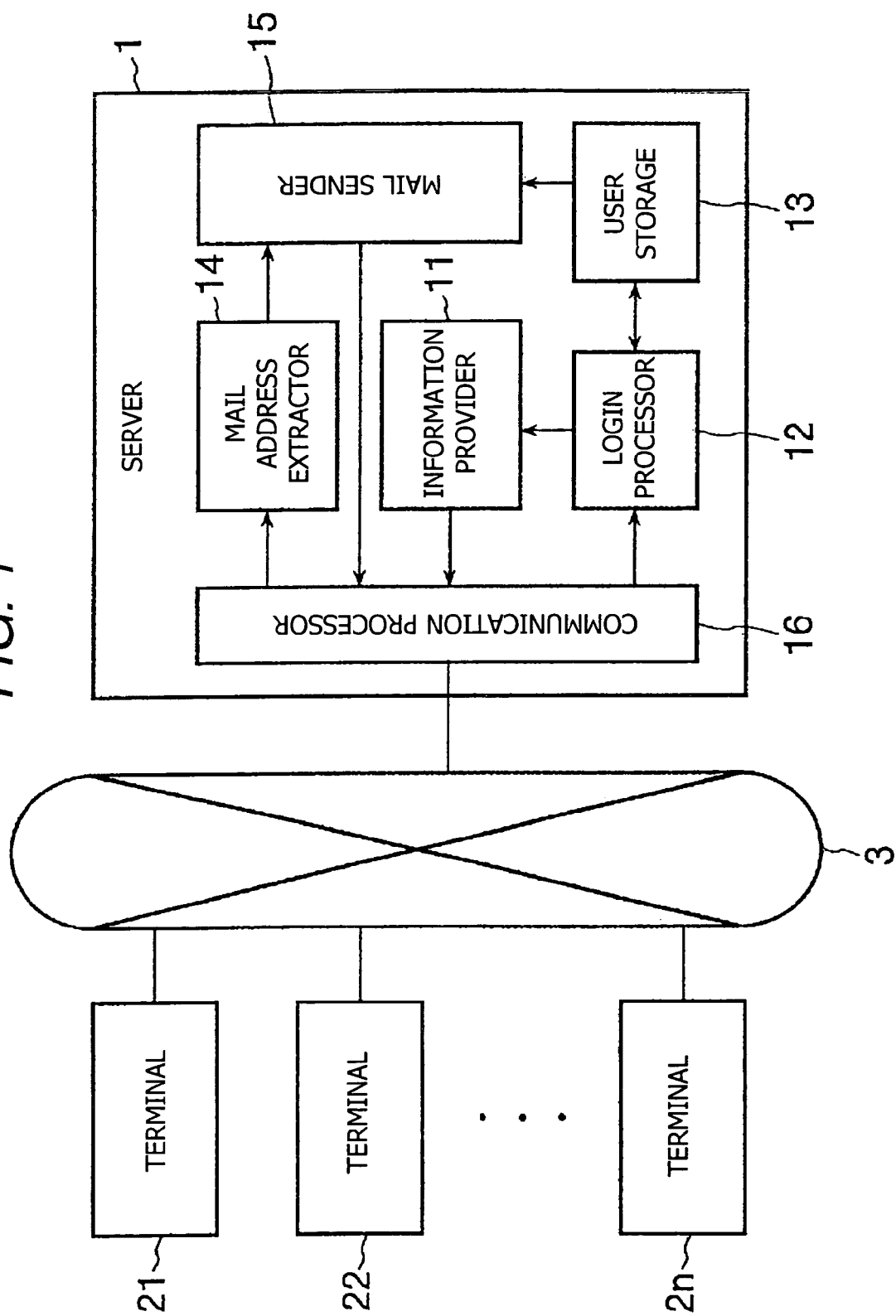
FIG. 1 is a block diagram showing the structure of a network system employed in an embodiment of the present invention.

FIG. 1 is a block diagram showing the structure of a network system employed in this embodiment. As shown, the network system comprises a server 1, and a plurality of terminals 21–2$n$ which are connected to the server 1 via the internet 3.

The server comprises functions of an information provider 11, a login processor 12, a user storage unit 13, a mail address extractor 14, a mail sender 15, and a communication processor 16. To realizes those components 11 to 16, the server 1 comprises hardware components such as a CPU 1A, a memory 1B, a communication device 1C, and a disk drive 1D, as shown in FIG. 2A. A program for realizing the functions of the components 11 to 16 is stored in a disk 1E. The disk drive 13 reads the program, and transfers the read program to the memory 1B. Or, the program is embedded in a carrier wave signal to be transmitted via the internet 3 from other computer (not shown). Thus transmitted program is received by the communication device 1C and is transferred to the memory 1B. The CPU 1A executes the program stored in the memory 1B to realize the functions of the components 11 to 16.

The information provider 11 generates information with which incentive is coupled in accordance with the number of the terminals 21 to 2$n$ which have logged in. The information provider 11 controls the communication processor 16 to transmit the generated information. The incentive coupled with the information to be sent by the information provider 11 may be, for example, winner prize which is increased each time the number of users of quiz service (the number of participants) reaches the predetermined number. The information provider 11 includes means for counting the number of the terminals 21 to 2$n$ which have logged in.

Information to be provided by the information provider 11 includes a graph indicating the relationship between the number of the terminals 21 to 2$n$ which have accessed, and points where the incentive level is risen. The information to be provided by the information provider 11 includes information which causes users of the terminals 21 to 2$n$ to input mail address to be sent to the server 1. The input mail address indicates destination of a friend introduction mail to be sent by the mail sender 15 to other terminals (described later).

The login processor 12 executes login process when the terminals 21 to 2$n$ requests for logging in the information. During the login process, the login processor 12 accesses the user storage unit 13 to determine whether the accessing terminals 21 to 2$n$ have logged in before or not based on ID numbers of the terminals 21 to 2$n$. The login processor 12 just allows the terminals 21 to 2$n$ which have logged in before to login the information provided by the information provider 11. On the contrary, the login processor 12 stores ID number, mail addresses, and the like of the terminals 21 to 2$n$ concerned which did not login before, on the user storage unit 13. And the login processor 12 sends information indicating new user's login to the information provider 11. After those processing, the login processor 12 allows the terminals 21 to 2$n$ concerned to login the information provided by the information provider 11.

The user storage unit 13 stores ID numbers, mail addresses of the terminals 21 to 2$n$ logged in the information provided by the information provider 11. Mail addresses stored on the user storage unit 13 will be utilized as mailing list for providing next information after providing the information concerned is completed.

The mail address extractor 14 extracts mail addresses for friend introduction from information sent by the logged-in terminals 21 to 2$n$. The mail sender 15 prepares a mail in accordance with predetermined format with setting the mail address extracted by the mail address extractor 14 as destination, and controls the communication processor 16 to transmit the prepared mail. Before providing new information, the mail sender 15 also prepares mails regarding to information sets provided before in accordance with predetermined format with setting the mail addresses stored in the user storage unit 13, and controls the communication processor 16 to transmit them.

The communication processor 16 transmits the information generated by the information provider 11 and mails generated by the mail sender 15 to the terminals 21 to 2n via the internet 3. The communication processor 16 receives information indicating login request which is transmitted by the terminals 21 to 2n via the internet 3, and transfers the received information to the login processor 12. The communication processor 16 also receives information via the internet 3 transmitted by the terminals 21 to 2n which have logged in the information provided by the information provider 11.

Each of the terminals 21 to 2n is a general purpose computer comprising a CPU 2A, a memory 2B, an input device 2C, a display unit 2D, a communication device 2E, and the like as shown in FIG. 2B. The CPU 2A executes a program stored in the memory 2B. The communication device 2E receives information (including mails) transmitted by the server 1. The display unit 2D displays the received information. A user of each of the terminals 21 to 2n inputs his/her name, his/her friend's name, and mail address through the input device 2D when attempting friend introduction. The communication device 2E transmits the input information to the server 1 via the internet 3.

An operation of the network system according to this embodiment will now be described with reference to the functional block diagram shown in FIG. 1. Process to be executed by the terminals 21 to 2n to receive information provided by the information provider 11 of the server 1 will now be described first. FIG. 3 is a flowchart showing process to be executed by the terminals 21 to 2n.

The user of each of the terminals 21 to 2n operates, for example, the input device 2C to input URL (Uniform Resource Locator) or to click hyperlinks on a promotional mail (described later) to select linked URL. The URL is transmitted to the server 1 by the communication device 2E (step S301). The communication device 2E receives a front page of the information from the server 1, and the display unit 2D displays the front page (step S302). The user clicks a button indicating "login" included in the displayed front age. In response to this action, the communication device 2E transmits a login request to the server 1 (step S303). The communication device 2E receives information provided by the information provider 11 in accordance with process (described later) for the login request executed by the server 1, and the display unit 2C displays the received information (step S304).

Thus, the process by the terminals 21 to 2n for receiving information from the server 1 is completed. The received information includes pages for introducing friends. The pages for introducing friends are prepared for transmitting a mail which recommends the users of the terminals 21 to 2n receiving the information provided by the information provider 11. The users of the terminals 21 to 2n can input his/her friend's (user of the other terminals 21 to 2n) mail address and his/her own mail address through the friend introduction page to transmit the such the information to the server 1.

Figure 4:
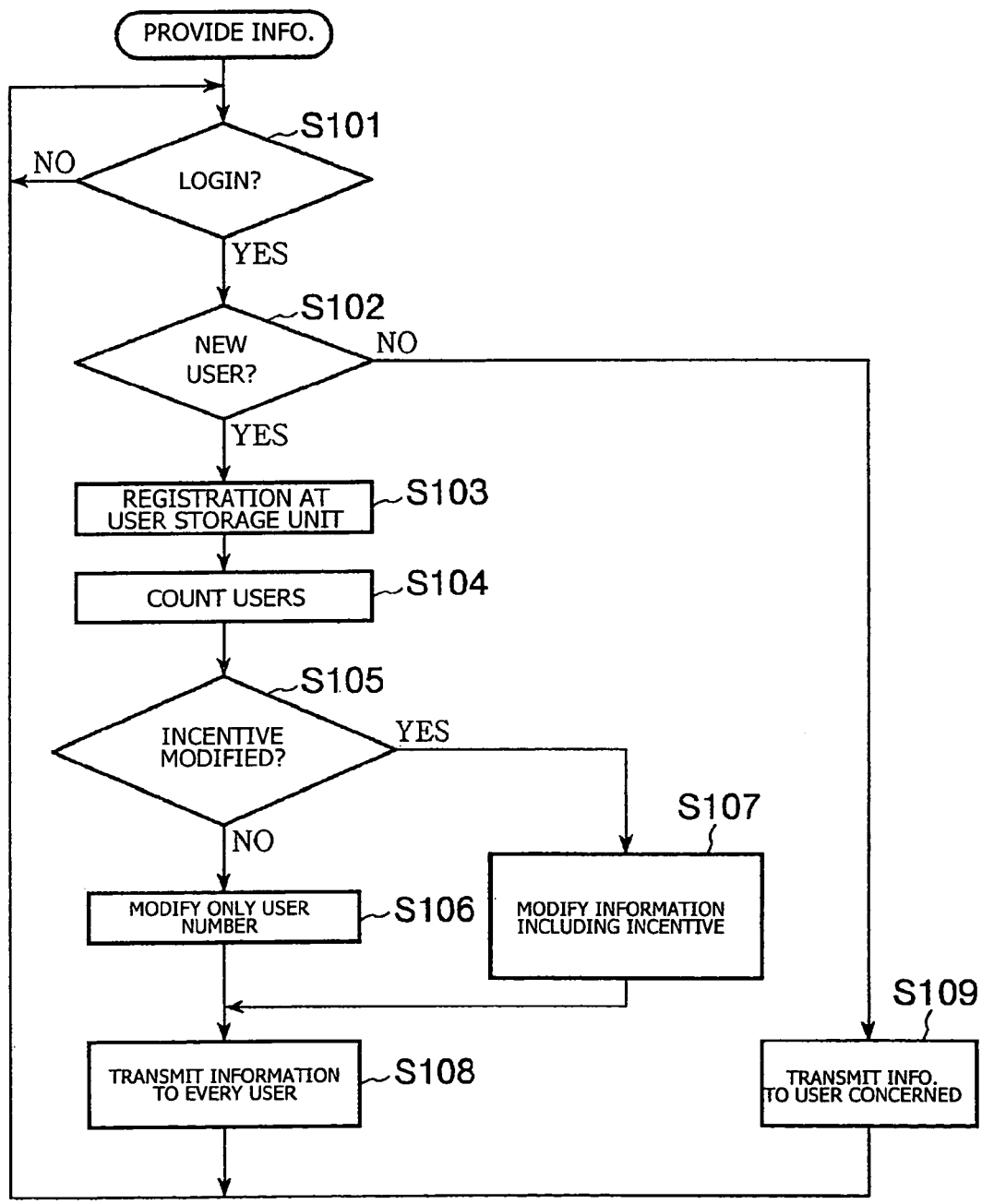
FIG. 4 is a flowchart showing process to be executed mainly by an information provider and a login processor shown in FIG. 1.

Process to be executed by the server 1 will now be described. FIG. 4 is a flowchart showing process to be executed mainly by the information provider 11 and the login processor 12 in order to supply information with which incentive is coupled to the terminals 12 to 2n from the server 1.

After the operation of the server 1 begins, the login processor 12 monitors whether the communication device 16 receives a login request from the terminals 21 to 2n to login the information provided by the information provider 11 (step S101). If it is determined that the login request does not arrive, the login processor 12 repeatedly executes step S101 to continue to monitor whether the communication processor 16 receives the login request.

If it is determined that the login request arrives, the login processor 12 determines whether a new user sent the login request or not by confirming whether the ID number of the terminal 21 to 2n which sent the login request has been registered at the user storage unit 13 or not (step S102). If a new user sent the login request, the login processor 12 registers ID number, etc. of the terminals 21 to 2n which sent the login request concerned at the user storage unit 13 (step S103).

The login processor 12 informs the information provider 11 that the login request arrived, together with sending information representing that the login request was given by a new user. In response to reception of the information indicating the new user's login request, the information provider 11 counts up the number of users who logged in so far, that is, counts us the number of the terminals 21 to 2n with using the internal count means (step S104). The information provider 11 determines whether the number of the users counted by the count means reaches the number for modifying the incentive coupled with the information to be provided (step S105). If the counted number of the users does not reach the number for changing the incentive, the information provider 11 modifies only the information regarding to the number of the users who have logged in the provided information (including aforementioned graph), and prepares new information (step S106). The flow forwards to step S108.

On the contrary, if the counted number of the users reaches the number for changing the incentive, the information provider 11 modifies not only the information regarding to the number of logged-in users, but also the contents of the incentive to be coupled with the information to be provided, thus prepares new information (step S107). The flow forwards to step S108.

At step S108, the information provider 11 controls the communication device 16 to transmit the information prepared at step S106 or S107 to all the terminals 21 to 2n which are currently logging in (the terminal which sent login request at step S101 included) via the internet 3. Then the flow returns to step S101 to make the login processor 12 monitor the reception of login request again.

Figure 5B:
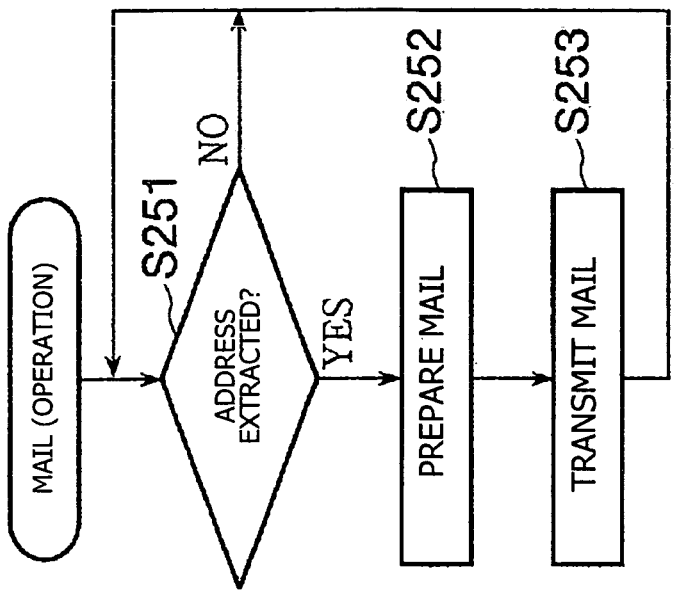
FIGS. 5A and 5B are flowcharts showing process to be executed by a mail sender shown in FIG. 1.
Figure 5A:
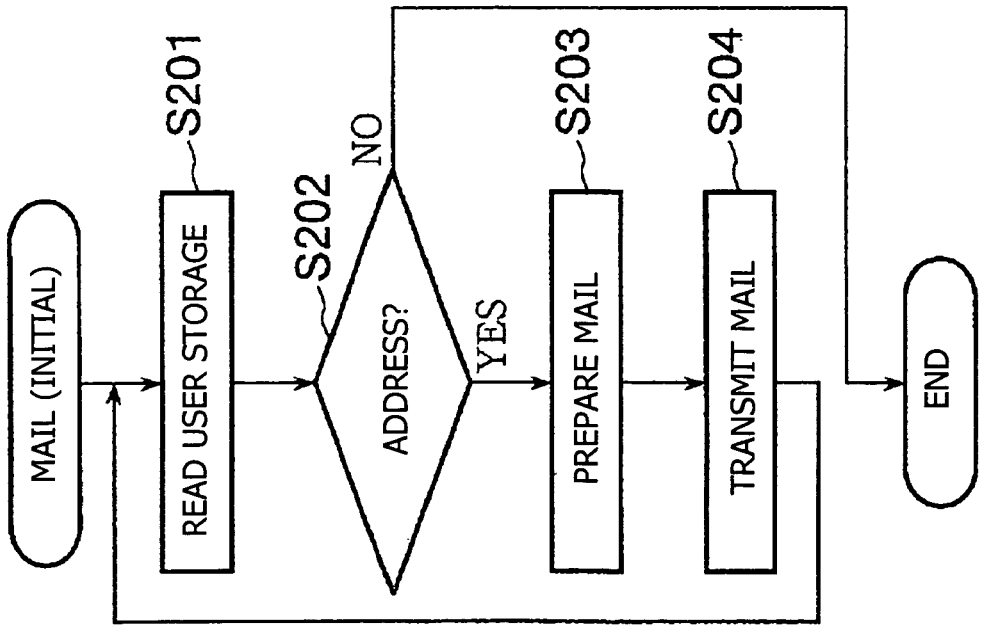

In this network system, mails are transmitted to the terminals 21 to 2n in order to make more terminals 21 to 2n receive information provided by the information provider 11 (hereinafter, those mails are referred to as promotional mails). FIG. 5A is a flowchart showing process to be executed by the mail sender 15 at initial stage of information providing by the server 1. FIG. 5B is a flowchart showing process to be executed by the mail sender 15 during an ordinary operation of the server 1.

The process to be executed at initial stage after the server 1 starts to provide information will now be described first. The mail sender 15 reads mail addresses for the users of the terminals from the user storage unit 13 in order (step S201). Those mail addresses were stored in the user storage unit 13 when the corresponding terminals received the information provided before in the same manner (that is, the mail address represents the users who enjoyed the similar service before). The mail sender 15 determines whether the mail addresses have been read from the user storage unit 13 successfully or not (step S202).

If the mail addresses have been read successfully, the mail sender 15 prepares promotional mails in accordance with predetermined format corresponding to the information to be provided by the information provider 11 (step S203). The read mail addresses are set as destinations of the prepared promotional mails. Further, the mail sender 15 transfers the prepared promotional mails to the communication processor 16 to send them to the set mail addresses via the internet 3 (step S204).

The flow returns to step S201 so that the mail sender 15 reads next mail address from the user storage unit 13. On the contrary, if it is determined at step S202 that the mail addresses have not been read successfully, that is, all mail addresses have been read already, the mail sender 15 terminates this processing.

The process to be executed during ordinary operation of the server 1 will now be described. The mail sender 15 monitors the mail address extractor 14 whether mail addresses sent as friend introduction have been extracted or not (step S251). If it is determined that the mail addresses have not been extracted, the mail sender 15 executes the process at step S251 repeatedly to continue to monitor the mail address extractor 14.

On the contrary, if it is determined that the mail addresses have been extracted according to monitoring the mail address extractor 14, the mail address sender 15 prepares promotional mails in accordance with the predetermined format corresponding to the information to be provided by the information provider 11 with setting the extracted mail addresses as destinations (step S252). The format for the promotional mails may be modified in accordance with the number of the terminals 21 to 2n which have logged in or the contents of the incentive being currently offered.

The mail sender 15 further transfers the prepared mails to the communication processor 16 to send them to the set mail addresses via the internet 3 (step S253). The flow returns to step S251 so that the mail sender 15 continues to monitor the mail address extractor 14.

An operation of the network system according to this embodiment with reference to examples. In this embodiment, the information provider 11 provides quiz service. The amount of winner's prize to be provided as incentive will increase in accordance with the number of participants of the quiz service.

Figure 6A:
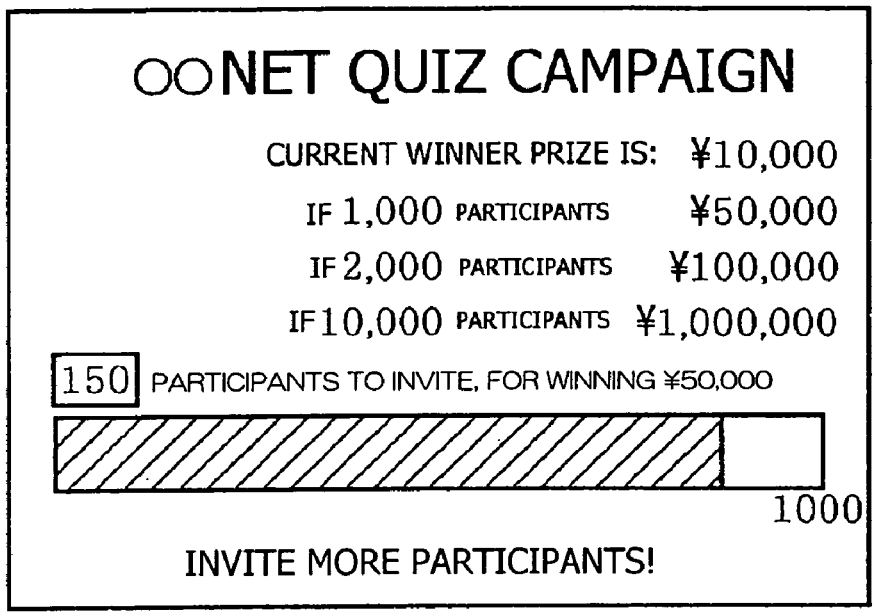
FIGS. 6A and 6B are diagrams exemplifying information to be sent to the terminal from the server shown in FIG. 1.
Figure 6B:
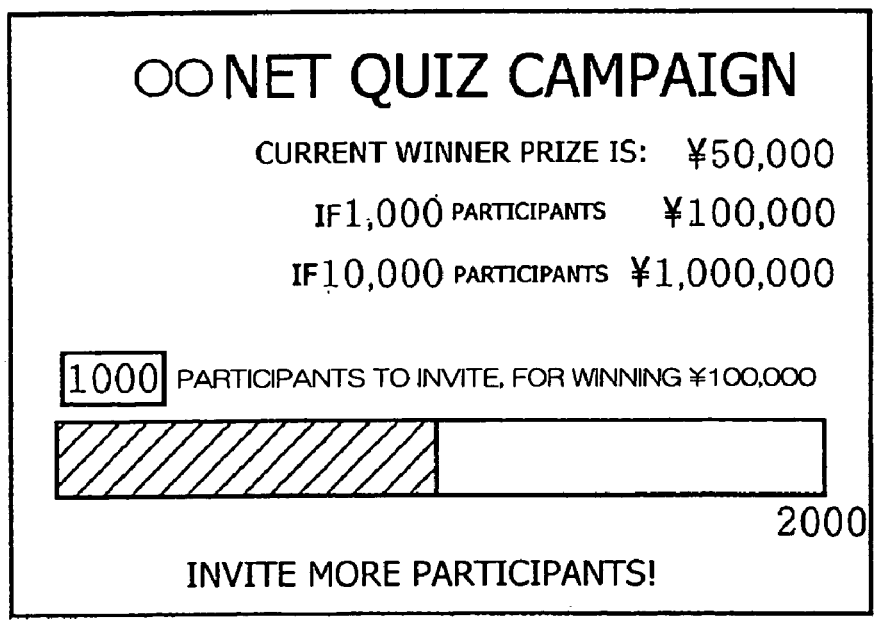

FIGS. 6A and 6B are diagrams exemplifying information to be provided by the information provider 11. As shown in FIG. 6A, initial prize for a quiz winner is ¥10,000. It raises up to ¥50,000 as the number of the participants becomes 1,000, up to ¥100,000 as the number of the participants becomes 2,000, and up to ¥1,000,000 as the number of the participants becomes 10,000. That is, the winner's prize raises as the number of the participants increase. FIG. 6A shows the state where the number of the participants is 850, and ¥10,000 is set to the winner's prize in accordance with information to be provided by the information provider 11. As shown at lower portion of FIG. 6A, required additional number of participants necessary for raising the winner's prize is 150. Below the indication, a graph is prepared to graphically show ratio of the number of current participants: 850 to the necessary number of participants for raising the prize: 1,000.

FIG. 6B shows the state where the number of the participants becomes 1,000, and the winner's prize is ¥50,000. As well as the state shown in FIG. 6A, the winner's prize raises as the number of the participants increases. However, the winner's prize never drop down to the initial amount. Therefore, the initial amount of the winner's prize is not indicated as shown in FIG. 6B. As shown at lower portion of FIG. 6B, it indicates required number of the participants necessary for raising the winner's prize: 1,000, and a graph which graphically indicates ratio of the number of current participant: 1,000 to the number of the participants necessary for raising the prize: 2,000 is prepared.

An example where friend introduction for recommending receiving information provided by the information provider 11 will now be described with reference to FIGS. 7A and 7B. The information to be provided by the information provider 11 includes a friend introduction page as shown in FIG. 7A. A user of any of the terminal 21 to 2n makes the display unit 2D display the friend introduction page, inputs his/her friend's name, his/her name and mail address through the input device 2C, and clicks "Submission" button. The communication device 2E transmits the input friend's name, user's name, and mail address to the server 1 via the internet 3.

In the server 1, the mail address extractor 14 extracts names of the participant (a user who transmitted the information) and his/her friend, and mail address in accordance with the friend introduction page from various information sets received by the communication processor 16 from the terminals 21 to 2n. The mail address extractor 14 transfers the extracted names of the participant and his/her friend and mail address to the mail sender 15.

The mail sender 15 inserts the names of the participant and his/her friend and mail address supplied from the mail address extractor 14 to the mail format shown in FIG. 7B to prepare a promotional mail. The mail sender 15 control the communication processor 16 to transmit the promotional mail to destination indicated by the mail address transferred from the mail address extractor 14.

The user of any of the terminals 21 to 2n who receives the promotional mail (the aforementioned friend) is promoted to join the quiz service provided by the server 1, because the incentive being offered is indicated by the mail. Moreover, since the mail includes the introducer (the aforementioned participant), promotion to join the quiz service is spread like grapevine. URL shown at lower portion of FIG. 7B is hyperlink. Therefore, the user (the aforementioned friend) is able to join the quiz service just by clicking URL included in the mail.

According to the network system of this embodiment as described above, the information provider 11 counts the number of new corners of the terminals 21 to 2n, and modifies the contents of the incentive being offered each time the counted number becomes predetermined numbers. Such the modification of the incentive will be attraction for the users to utilize information provided by the information provider 11, thus, it promotes the information providing service. As a result, the number of users of the information provided by the information provider 11 increase efficiently.

The information provided by the information provider 11 includes a graph which indicates the relationship between the number of the terminals 21 to 2n and points where the incentive level raises. Since the graph is displayed on the display unit 2D of the terminals 21 to 2n, it is expectable that each user recommends the information service provided by the server 1 to others such as friends. As a result, the number of the users of the information provided by the information provider 11 further increase effectively.

The mail sender 15 sends promotional mails to users of the terminals 21 to 2n at initial stage after the server 1 starts to provide information and during ordinary operation of the server 1. Therefore, the number of persons who receive the information provided by the information provider 11 further increases efficiently. Especially, destinations of promotional mails sent by the mail sender 15 during the ordinal operation of the server 1 are represented by mail addresses which have been sent by users who have been provided with the information by the information provider 11. According to this structure, the promotional mails are sent to not only persons who are selected by the information provider, but also to persons who are introduced by members via the terminals 21 to 2n. As a result, the number of persons who receives information provided by the information provider 11 further increases efficiently.

Various embodiments and changes may be made thereunto. Modified embodiments applicable to the present invention will now be described.

In the above described embodiment, the login processor 12 accesses the user storage unit 13 to check login history. The information provider 11 counts the number of the terminals 21 to 2n which have logged in, when the information provider 11 is informed by the login processor 12 that the terminals 21 to 2n concerned have not logged in before. The information processor 11 may count the number of the terminals 21 to 2n each time the terminals 21 to 2n log in even if they have logged in before.

In the above described embodiment, information provided by the information provider 11 is information for providing quiz service, and incentive to be offered is to provide a quiz winner with the prize. However, the contents of the incentive to be received by the information receiver, that is, the user of the service is not limited to that. For example, incentive which realizes a concert of famous artist if the number of users exceeds predetermined number thus the users gain a sense of achievement, may be applicable.

Plural kinds of incentives which are selectable by the users of the terminals 21 to 2n which are logging in the information provided by the information provider 11 may be applicable. In this case, the number of the users may be counted under incentive categories, or based on the number of the terminals 21 to 2n which are logging in. In any cases, the contents of the incentive may be modifiable in accordance with the count.

In the above described embodiment, the contents of the incentive is modified when thee number of the terminals 21 to 2n which have logged in the information provided by the information provider 11 reaches the predetermined numbers. That is, the contents of the incentive is modified stepwise. However, the contents of the incentive may be modified successively in accordance with the number of the terminals 21 to 2n which have logged in the information provided by the information provider 11. The incentive may be, for example, prize obtained by predetermined calculation based on the number of the terminals 21 to 2n which are logging in the information provided by the information provider 11.

In the above described embodiment, the contents of the incentive coupled with the information provided by the information provider 11 has no significant limitations. The contents of the incentive may be limited so as to obey any regulations such as law. In this case, contents following the regulation may be prepared. Otherwise, various regulations may be stocked in a database, and incentives prepared without considering the regulations may be compared with the stocked regulations before providing.

In the above described embodiment, the mail sender 15 transmits promotional mails whose destinations are represented by mail addresses which were registered at the user storage unit 13 when the similar information providing, soon after the server 1 starts to provide information. However, the mail sender 15 may transmit the promotional mails whose destinations are represented by, for example, mail addresses stored in a database of users being under contract to an internet service provider which manages the server 1.

In this case, the mail addresses stored in the database may be categorized by predetermined standards (for example, attribution such as contractor's gender and age, or user's preference such as history of selected incentives, history of response to quiz or questionnaires). The mail sender 15 may transmit the promotional mails whose destinations are represented by the mail addresses of a category in accordance with the contents of the information provided by the information provider 11 or contents of the incentive coupled with the information.

In the above described embodiment, the mail sender 15 transmits promotional mails whose destination is represented by mail addresses sent by the members of the service as a method for collecting information receivers, that is, users of the service during ordinary operation of the server 1. However, the method for collecting the information receivers, that is, the users of the service is not limited to the above. For example, bulletin board may be applicable. Otherwise, the mail sender 15 may provide the member of the service with mails which asking the member to transfer them to others with enclosure for promoting the receivers to participate the service.

In the above described embodiment, it has described the example of the system wherein the server 1 and the terminals 21 to 2n are connected via the internet 3. However, the present invention may be applicable to a system wherein a server and terminals are connected via a closed commercial network. The present invention may be applicable to a system including mobile phones as terminals which receive various kinds of information via base stations.

This application is based on Japanese Patent Application No. H11-267258 filed on Sep. 21, 1999 and including specification, claims, drawings and summary. The disclosure of the above Japanese Patent Application is incorporated herein by reference in its entirety.

What is claimed is:

1. A network system which comprises a server, and a plurality of terminals connected to said server via a network, and is configured to provide a predetermined service to said terminals via said network from said server, wherein, said server comprises:

request receiving means for receiving a request for the service transmitted by each of said plurality of terminals via said network;

information transmitting means for transmitting information corresponding to the service to be provided to each terminal which has transmitted the request for the service received by said request receiving means via said network;

incentive offering means, responsive to the reception of said request, for offering a predetermined incentive to each terminal which has transmitted the request for the service received by said request receiving means;

requests count means for counting the number of said terminals each of which has transmitted the request for the service received by said request receiving means; and incentive modifying means for modifying a content of the incentive to be offered by said incentive offering means in accordance with the number of said terminals counted by said requests count means, each of said terminals comprises:

request transmission means for transmitting the request for the service to said server for providing the service via said network; and information receiving means for receiving the information corresponding to the service to be provided, which is transmitted by said information transmission means via said network.

2. The network system according to claim 1, wherein said server further comprises promotional information transmitting means for transmitting information for promoting the request for the service together with information representing a content of the incentive to be offered to the predetermined number of terminals of said plurality of terminals via said network.

3. A network system which comprises a server, and a plurality of terminals connected to said server via a network, wherein said server comprises a memory for storing a program, a processor for executing said program, and a first communication device for transmitting/receiving information to/from said plurality of terminals, receives a request for providing a predetermined service transmitted by each of said plurality of terminals via said network, through said first communication device, counts the number of said terminals each of which has transmitted the request for the service, transmits information corresponding to the service to be provided, to the terminals each of which has transmitted the request in response to reception of the request, via said network through said first communication device, responsive to the reception of said request, offers an incentive to each terminal which has transmitted the request for the service to said server in return to promote that service, and modifies a content of the incentive to be offered, in accordance with the counted number of said terminals, each of said plurality of terminals comprises a memory for storing a program, a processor for executing said program, an output device for outputting information, and a second communication device for transmitting/receiving information to/from said server, requests said server to provide the service, via said network through said second communication device, receives the information transmitted by said server in response to the request via said network, through said second communication device, and outputs the received information through said output device.

* * * * *